Feb. 14, 1950 C. E. CHESSER ET AL 2,497,258
DEEP WELL COOKER
Filed Aug. 20, 1945 3 Sheets-Sheet 1
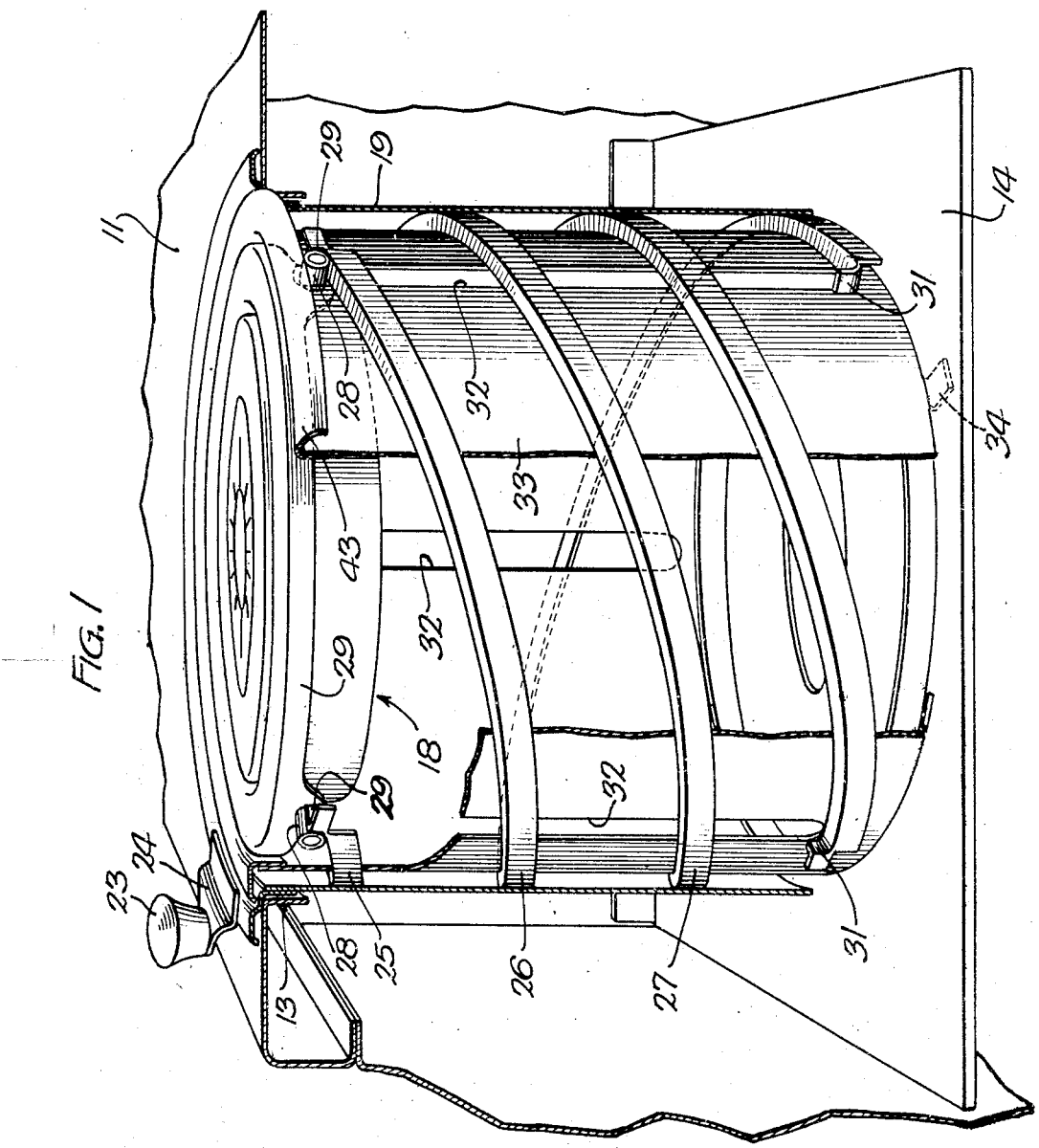
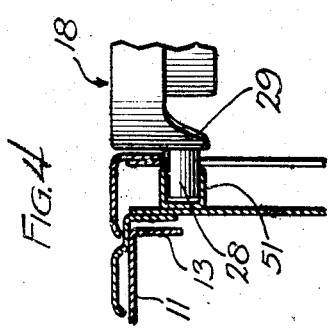
INVENTORS
CECIL E. CHESSER
TRUMAN H. CLINE
BY
Louis Sheldon
ATTYS.

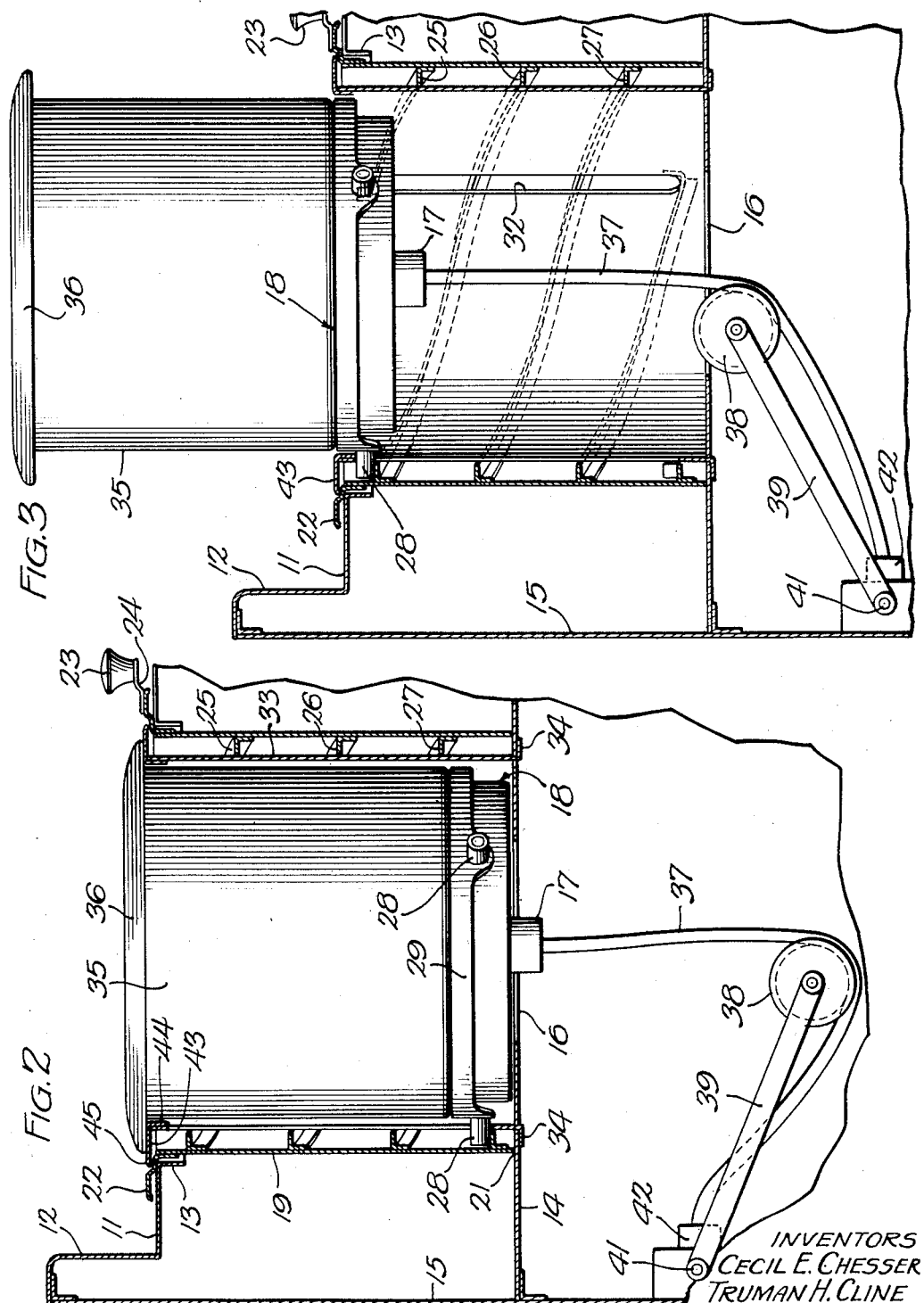

Feb. 14, 1950  C. E. CHESSER ET AL  2,497,258
DEEP WELL COOKER
Filed Aug. 20, 1945  3 Sheets-Sheet 3
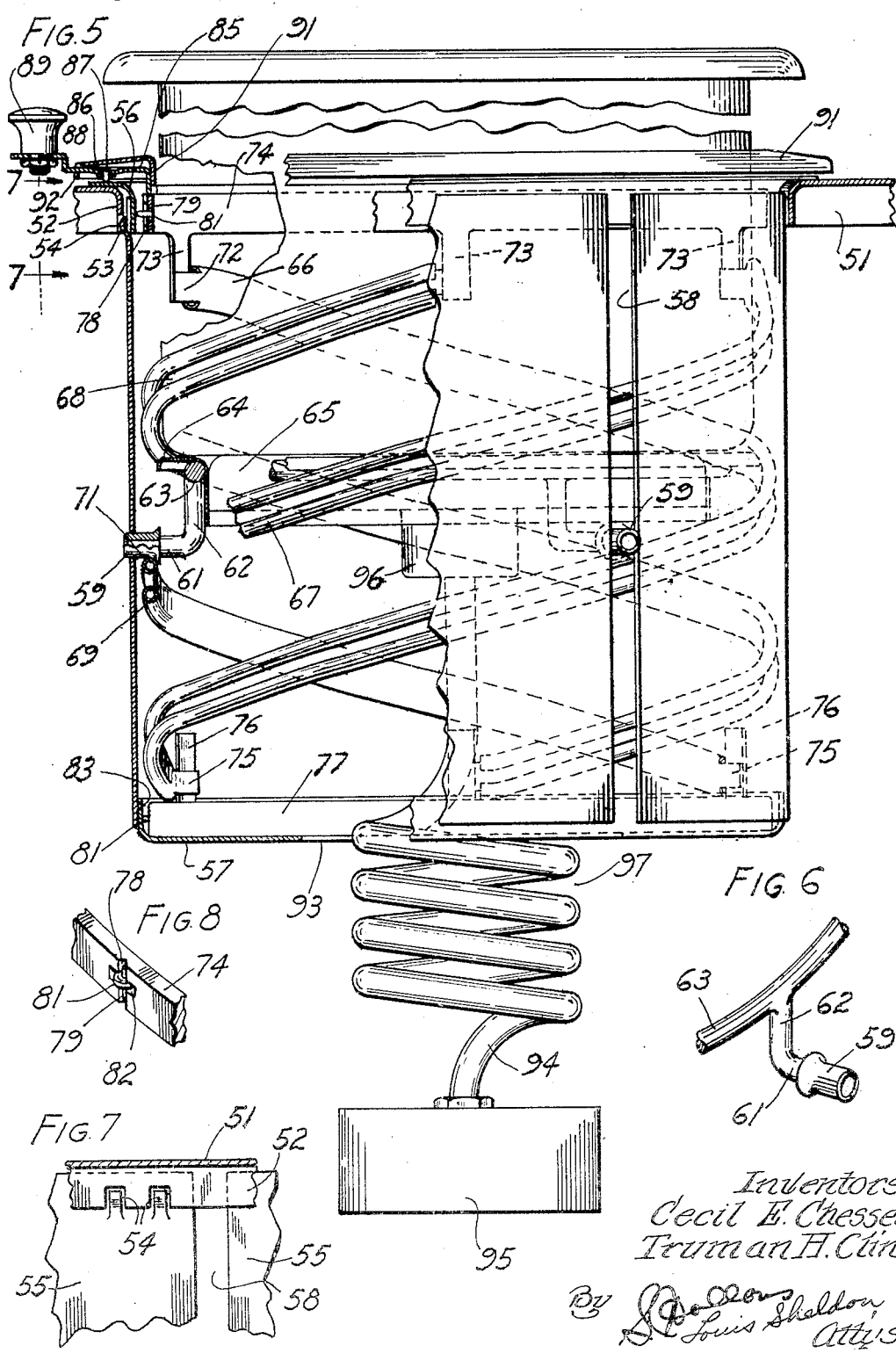
Inventors
Cecil E. Chesser
Truman H. Cline
By Louis Sheldon
Attys.

Patented Feb. 14, 1950

2,497,258

UNITED STATES PATENT OFFICE 2,497,258

DEEP WELL COOKER

Cecil E. Chesser, Hebron, and Truman H. Cline, Newark, Ohio, assignors to Newark Stove Company, Newark, Ohio, a corporation of Ohio Application August 20, 1945, Serial No. 611,526

8 Claims. (Cl. 219—35)

The present invention relates to oven cooking apparatus and is more particularly concerned with a surface receding or well type of cooker heating unit.

Mechanisms of this general class are particularly well known in connection with electric cooking ovens and the instant improvement concerns itself with the provision of a deep well cooking apparatus in which the heating plate and certain elements of the supporting structure are made adjustable as to surface level so as to afford variations in the depth of cavity, whereby cooking vessels may be supported under variable conditions accordingly.

A principal object of this invention is to provide a deep well heating apparatus in which the heating unit may be adjusted in infinite degrees of variable levels from an uppermost one horizontal with an oven top plate to a lowermost extremity so that contained cooking vessels may be totally submerged.

For a more comprehensive understanding of the invention, reference will now be had to the particular details of construction illustrated in the accompanying drawings and described in the hereinafter detailed specification wherein similar reference characters designate corresponding parts throughout and wherein:

Fig. 1 is a perspective view of a deep well mechanism having embodied therein certain features incident to the present invention with certain parts broken away and other parts in vertical section;

Fig. 2 is a transverse sectional view through a typical electric oven structure showing the apparatus disclosed in Fig. 1 applied, and the adjustable heating plate thereof in its lowermost submerged level.

Fig. 3 is a transverse sectional view similar to Fig. 2 but illustrating the heating plate raised to its uppermost extreme level;

Fig. 4 is a fragmentary detail sectional view of a modified form of heating plate supporting channel structure;

Fig. 5 is a transverse sectional view with parts broken away of a modified deep well oven structure embodying certain principles of the present invention;

Fig. 6 is a fragmentary detail perspective view of a supporting ring and one of its spider rollers;

Fig. 7 is a fragmentary detail sectional view taken approximately on line 7—7 of Fig. 5; and Fig. 8 is a fragmentary detail perspective view of one of the peripheral bearing rollers and features its manner of mounting within a special mounting ring.

Referring now more particularly to the accompanying drawings, the reference character 11 designates the table top of a conventional type of cooking stove or oven having a back wall panel 12 and including an over-all area which may support or house other heating implements such as is conventional in cooking ovens and electric ranges. To accommodate the particular apparatus, the table top 11 is provided with a recess defined by a downwardly extending flange 13, Figs. 1 to 3, and an intermediate horizontal supporting panel 14 which may be suitably secured to the back wall 15. The horizontal panel 14 is provided with a central opening at 16 generously proportioned to provide ample clearance from the cable connection 17 which is attached to the heating plate unit generally designated 18.

A cylindrical sleeve 19 is adapted to be received within the opening defined by the flange 13 and is of such height that when its lowest extremity 21 rests upon the supporting panel 14, an integrally associated flange 22 secured near the upper extremity of wall 19 marginally clears the table top surface 11.

An operating knob 23 carried by an arm 24 is welded or otherwise made secure to the flange 22 and the cylinder 19 may be rotated thereby to attain the adjustment of the deep well apparatus as will now be explained. Equally spaced from each other and starting at three circumferentially spaced points on the internal surface of the cylinder 19, is a series of three (in the instant example) angle-metal trackways designated 25, 26 and 27. In accordance with this arrangement corresponding portions of each trackway at any horizontal level are equidistant from each other circumferentially.

Accordingly the three roller elements 28, each rotatably supported on horizontally extending pivot studs in a peripheral flange 29 of the heater unit 18, will be jointly supported by the three trackways 25, 26 and 27 at whatever level the heater unit 18 may happen to be disposed. Also, it is to be noted that the three track elements at their upper extremities are provided with upstanding stop abutments 30 and corresponding stop abutments 31 at their lower extremities, Fig. 1.

By means of this arrangement the rotation of the cylinder 19 causes the several trackways 25, 26 and 27 to assume infinitely variable positions at which the several rollers 28 are horizontally supported in vertical adjustment. More-over each roller 28 is adapted to extend through a vertical slot 32 of which there are three in an inner cylindrical structure 33 which is secured by the overlapping tabs 34 which protrude through the openings provided therefor in the intermediate panel 14. The slots 32 prevent the heating unit 18 from rotating about the vertical axis which is the center of the unit in addition to which they confine the extent of travel in a vertical direction to which the unit 18 is subjected.

An appropriate cooking vessel 35 which may be employed in conjunction with this apparatus is one which has adequate clearance from the internal cylindrical wall 33 and is provided with a flange or cover 36. The extent to which the vessel 35 descends within the well is controlled by the level at which the heating unit 18 is supported by the trackways 25, 26 and 27. In accordance with the elevation of the heating unit 18 the electrical conductor cable 37 will be raised and lowered correspondingly and in order to safeguard against kinking and inadvertent obstruction with the surrounding apparatus a weighted slack roller 38 is provided, pivoted on an arm 39 which in turn is carried on a pivot center 41 adjacent the cable connection terminal 42.

In the elevated position of the heating unit 18 the cable and slack roller 38 assume the position indicated in Fig. 3 and in the lower position of the unit 18 the slack roller and its associated elements assume the position indicated in Fig. 2.

A concealment ring 43 is preferably provided, having a flange 44 secured to the inner surface of the cylinder 33 and overlapping the space between the two cylinders so that its peripheral flange 45 rests upon an annular recess or depression in the operating ring 22 above mentioned. In accordance with this arrangement the track elements 25, 26 and 27 are protected against inadvertent overspilling of cooking contents and the entire assembly is esthetically dressed to meet merchandising and artistic standards.

*Modifications*

In Fig. 4, there is illustrated the general arrangement of elements shown in Figs. 1 to 3 in identical correspondence as indicated by the reference numerals, except that the tracks in this instance are formed of channels 51 for receiving the rollers 28. The channel elements are bent to provide spiral guideways and the rollers 28 are introduced into the space between the side walls of the track channels. Otherwise the arrangement and distribution is identical with the preferred embodiment disclosed above. By means of this modified structure, the unit 18 is retained rigidly in a vertical direction and is prevented from upsetting which may otherwise result through careless handling.

In Figs. 5 to 8 a further modification of deep well structure is particularized. Here a table top 51 is provided with a skirting flange 52 having at predetermined points notches 53 into which are adapted to reside struck detent formations 54 formed in each one of three cylindrical wall segments 55 together forming the peripheral contour of an outer wall formation and including an upper flange ring 56 and a lower pan 57.

Between the three wall segments 55 there are provided vertical spaces 58, the latter serving as guide spaces for three rollers 59 carried upon radially extending extremities 61 of the spider legs 62 integral with the annular supporting ring 63. Ring 63 is nested beneath a sheet metal flange ring 64 to which is secured the heating unit generally designated 65. Each one of the guide rollers 59, in addition to protruding through its associated vertical guide space 58, also rests upon one of three spiral trackways 66, 67 and 68, as indicated in Fig. 5.

In this embodiment the spiral trackways are preferably formed of sheet metal having their opposite edges rolled over as at 69 and 71, and each track is secured at its upper extremity by having a laterally extending lug 72 welded or riveted to one of three downwardly extending projections 73 integral with an annular bearing ring 74. The lower extremities of each one of the tracks 66, 67 and 68 is correspondingly secured through its lugs 75 to upstanding projections 76 formed in a lower bearing ring 77.

Each of the bearing rings 74 and 77 is provided with a plurality of vertical notches 78, Figs. 5 and 8, within which are placed and welded minute pivot shafts 79 mounting roller bearings 81. Appropriate horizontal clearance notches 82 are provided for the roller bearings 81 and of the latter the upper ones are adapted to ride the inner wall surface of ring 56, and the lower ones the inner wall surface of the vertical cylindrical wall 83 of the pan 57.

A plurality of angularly formed brackets 85, Fig. 5, having the vertical portions thereof secured as by welding to the upper bearing ring 74 extend radially and have horizontal portions which afford support to individual journal pins 86 that carry vertical thrust bearing rollers 87. Of the several of said brackets 85 one is somewhat longer than the others and its extension 88 carries an operating knob 89. The several brackets 85 are preferably concealed by an ornate flange ring 91 having a vertical cylindrical wall portion and a radial disc portion as best indicated in Fig. 5. The ring 91 may, if preferred, be notched as at 92 to straddle the brackets 85 and thereby rotate as a part of the assembly together with the track supporting bearing rings 74 and 77.

When the assembly is rotated by means of the manipulation knob 89 the several trackways 66, 67 and 68 are correspondingly disposed and will effect the raising and lowering of the annular spider ring 63 and its associated heating unit 65 by reason of the engagement of each of said tracks with its respective roller 59.

The lower pan 57 is provided with a clearance opening 93 through which there is admitted the power supply cable 94, one end of which is secured to a concentric anchor or terminal block 95 whereat it is electrically connected to a power source and at its other end to a terminal fitting 96 at the center of the heating unit 65. The cable 94 is preferably spring urged in a coil formation as at 97 in any of several well known manners so that as the heating unit 65 is variously adjusted for horizontal level, the coils 97 will become appropriately distended or compressed accordingly.

While the present invention has been explained and described with reference to a specific contemplation or structure, it is to be understood nevertheless that numerous modifications and variations may be incorporated without departing from the essential spirit or scope thereof. Accordingly it is not intended that the foregoing detailed specification, nor the illustrations in the accompanying drawings shall constitute any limitation or restriction upon the scope of this invention, except as indicated in the hereunto appended claims.

The invention claimed is:

1. In a deep well cooking apparatus, a pair of spaced horizontal panels, an outer cylindrical element extending between said panels and provided with an operating handle for manual rotation thereof, a series of equally spaced helical track elements secured upon the inner wall surface of said cylindrical element, a heating unit having radially extending support means for engaging said track elements, and a device for confining said heating unit to longitudinally adjustable movement in accordance with the disposition of said helical track elements.

2. In an electric cooking apparatus, a horizontal table element having a circular opening therein, a horizontal supporting panel below and spaced from said table element, a cylindrical member extending through the opening of said table element and supported upon said panel, a plurality of helical trackways carried by said cylindrical member, a heating unit having a plurality of trackway engaging means, apparatus for rotating said cylindrical member and said trackways, and means between said trackways and said heating unit having vertical guide openings therein for confining said heating unit to variable vertical adjustment in accordance with the disposition of said supporting trackways.

3. In a deep well cooking apparatus, a pair of horizontal elements, a circular opening in the upper one of said elements, a pair of concentric cylinders extending through said opening, the outer one of said cylinders being rotatable and resting upon the lower one of said elements and the inner one of said cylinders being secured in said lower one of said elements, a plurality of equally spaced and similarly pitched helical trackways secured to the outer one of said cylinders, and a heating unit having a plurality of rollers corresponding in number to said trackways and extending through vertical openings in said inner cylinder for engagement with said trackways to impart variable levels of adjustment to said heating unit.

4. In a deep well cooking apparatus, a supporting table having a circular opening, a pair of concentric cylindrical elements extending through said opening, the outer one of said cylindrical elements being rotatable and the inner one of said cylindrical elements being secured, a plurality of equally spaced and similarly pitched helical trackways secured to the outer one of said cylindrical elements, and a heating plate having a plurality of rollers corresponding in number to said trackways and extending through vertical openings in said inner cylindrical element for engagement with said trackways to afford variable levels of adjustment to said heating plate.

5. In an electric cooking apparatus, a horizontal table element having a circular opening therein, a horizontal supporting panel below and spaced from said table element, a cylindrical member extending through the opening of said table element and supported upon said panel, a system of helical trackways carried by said cylindrical member, a heating unit having a plurality of trackway engaging means, apparatus for rotating said cylindrical member and said trackway system, and a secondary cylindrical element between said trackways and said heating unit having vertical guide openings therein for confining said heating unit to variable vertical positions.

6. In an apparatus for varying the horizontal level of a heating unit, a set of helical trackways equally pitched and spaced, journal rings at opposite ends of said trackways to which their terminals are secured, trackway rollers associated with said heating unit and riding said trackways, and a cylindrical enclosure having vertical guide slots for receiving said rollers to confine them to vertical movement under level adjustment of said trackways.

7. In a deep well cooking implement, a heating plate having a plurality of radially extending support elements, means for confining said heating plate against rotation, and cam means engaging said support elements simultaneously for variably adjusting their level and therethrough the level of said heating plate, said cam means comprising a plurality of spiral tracks, and a circular element secured to the upper and lower extremities of said tracks whereby said elements and tracks constitute a unitary structure for vertically shifting the heating plate, the upper of said circular elements having a projecting manipulating member for rotating said plate shifting structure.

8. In a combination as defined in claim 2, an electrical conductor connected to said heating unit, and take-up means for said conductor mounted below said supporting panel.

CECIL E. CHESSER.
TRUMAN H. CLINE.

REFERENCES CITED

The following references are of record in the file of this patent:

UNITED STATES PATENTS

| Number | Name | Date |
|---|---|---|
| 923,224 | Welch | June 1, 1909 |
| 1,825,406 | Lipham | Sept. 29, 1931 |
| 2,025,252 | Stencell | Dec. 24, 1935 |
| 2,257,580 | Trompeter | Sept. 30, 1941 |
| 2,416,645 | Rutenber | Feb. 25, 1947 |